(12) United States Patent
Tharakan

(10) Patent No.: US 6,798,830 B1
(45) Date of Patent: Sep. 28, 2004

(54) METHODS AND APPARATUS FOR GENERATING A TEST SIGNAL FOR XDSL DEVICES

(75) Inventor: Nancy T. Tharakan, Cambridge, MA (US)

(73) Assignee: Teradyne, Inc., Boston, MA (US)

( * ) Notice: Subject to any disclaimer, the term of this patent is extended or adjusted under 35 U.S.C. 154(b) by 789 days.

(21) Appl. No.: 09/677,028

(22) Filed: Sep. 29, 2000

Related U.S. Application Data

(60) Provisional application No. 60/217,294, filed on Jul. 11, 2000.

(51) Int. Cl.⁷ .......................... H04B 17/00; H04B 3/46; H04Q 1/20
(52) U.S. Cl. .................. 375/224; 375/260; 714/714
(58) Field of Search .................. 375/224, 226–228, 375/257, 260; 324/500, 537, 527, 532; 379/22.04, 22.03, 26.01, 27.03; 714/712, 714

(56) References Cited

U.S. PATENT DOCUMENTS

| | | | | |
|---|---|---|---|---|
| 4,301,536 A | * | 11/1981 | Favin et al. ................ | 714/714 |
| 6,058,162 A | * | 5/2000 | Nelson et al. ........... | 379/22.04 |
| 6,516,049 B1 | * | 2/2003 | Heidari et al. ............. | 379/1.01 |
| 6,650,658 B1 | * | 11/2003 | Mueller et al. ............. | 370/480 |

\* cited by examiner

*Primary Examiner*—Phuong Phu
(74) *Attorney, Agent, or Firm*—Barry W. Chapin, Esq.; Chapin & Huang, LLC

(57) ABSTRACT

A system, method and apparatus are disclosed for generating a test signal by selecting a set of frequencies for the test signal and selecting frequency sub-groups from the set of frequencies. The system generates a respective sub-group composite signal for each frequency sub-group selected from the set of frequencies and time shifts each respective sub-group composite signal in relation to other sub-group composite signals. The system then generates the test signal by summing each respective time shifted sub-group composite signal to produce the test signal. The system of the invention can be used to develop test signals for input into xDSL devices under test, and in particular, is highly beneficial when performing missing tone testing of xDSL devices.

30 Claims, 8 Drawing Sheets

TESTING A DEVICE

GENERATING A TEST SIGNAL

METHODS AND APPARATUS FOR GENERATING A TEST SIGNAL FOR XDSL DEVICES

CLAIM TO BENEFIT OF EARLIER FILING DATE OF PROVISIONAL PATENT APPLICATION

The present invention is related to, and claims the benefit of the filing date of, co-pending U.S. Provisional Patent Application Serial No. 60/217,294, entitled "METHODS AND APPARATUS FOR GENERATING A TEST SIGNAL FOR XDSL DEVICES" filed on Jul. 11, 2000. The teachings and contents of this Provisional Patent Application are incorporated herein by reference in their entirety.

FIELD OF THE INVENTION

The present invention generally relates to generating test signals for verifying communications devices, and more particularly to creating multi-tone test signals for missing tone tests of different types of Digital Subscriber Line (xDSL) devices to allow easy and flexible testing of such devices.

BACKGROUND OF THE INVENTION

Generally, xDSL devices, and in particular ADSL devices, convey signals over a bandwidth that ranges from 25 kHz to 1.2 MHz. This bandwidth is divided into different bands or channels, each of which is typically 4.3125 kHz wide. For example, an ADSL signal includes approximately 250 different bands, each 4.3125 kHz wide. To convey data, an xDSL modem provides a different carrier frequency for each of its bands, and provides modulated data around each of the carriers.

One test for determining proper operation of an xDSL device, and in particular an ADSL device, is called a "missing tone" test. The missing tone test determines whether a component (e.g., a circuit such as an application-specific integrated circuit or ASIC) within the xDSL device (e.g., an ADSL modem) introduces distortion into the output of one or more of the channels or frequency bands processed by the device during device operation. To perform a missing tone test, an ATE (automatic test equipment) system generates a broad band test signal and applies it to the input of an xDSL device. In response, the device generates an output. The ATE system samples the output and performs a Fast Fourier Transform or FFT of the output signal. During the test, the ATE system systematically removes individual tones (i.e., bands or channels) from the input waveform (i.e., the test signal), and evaluates the resulting FFTs after an xDSL device processes such a test signal. If the removed tones do not appear in the FFTs (i.e., the FFTs have only low level power components at the missing tone locations) then the test passes. In other words, if the broad band test signal that includes one or more missing bands is applied to the xDSL device and the device produces an output signal that contains little or no output at the location of the missing bands, then the test operator may consider the xDSL device as having passed the test (i.e., is functioning properly) since the device introduced little or no distortion into the original broadband test signal. However, if large components or distortion appear at the missing tone locations (e.g., removed bands or channels), the test operator can consider the xDSL device as having failed the missing tone test since a significant component at a missing tone location indicates that circuitry within the xDSL device has introduced distortion into its output at the missing tone locations.

"Crest Factor" (also known as "PAR" or Peak-to-Average Ratio) is a particularly important characteristic of xDSL signals. Crest factor is defined as the maximum amplitude of a test signal, divided by the average (i.e., Route Mean Squared value) of the signal, or:

Crest Factor=Peak Signal/Average Signal.

For performing missing tone tests, manufacturers desire to specify a particular crest factor of the test signal. Then, they are able to claim that their part has a particular distortion or lack thereof (measured using missing tone tests) at a particular crest factor.

SUMMARY OF THE INVENTION

It is often exceedingly difficult, using conventional techniques, to maintain a desired crest factor of a test signal as tones (i.e., carrier signal frequencies) are systematically removed for the purpose of performing missing tone tests.

Frequently, in conventional testing techniques, the removal of a tone signal from a test signal significantly changes the crest factor of the resulting test signal. This is because the test signal is typically a composite or summation of sine or cosine waves with coinciding peaks that form a peak value in the test signal over a short duration of the overall period of the test signal. Accordingly, removal of one tone signal can significantly change the peak value and the average value of the resulting composite test signal. For example, removal of a tone signal (e.g., a carrier frequency) from a composite signal formed by ten tone signals (therefore leaving only nine remaining tone signals) may reduce the peak value by approximately ten percent and may also therefore affect the average value of the test signal.

To maintain a constant crest factor of a test signal, test developers using conventional techniques customarily perform the trial and error task of manually and repetitively adjusting the phases of the remaining tones in the test signal, and re-measuring the resulting crest factor of that test signal. This manual and repetitive process can consume significant time. As a test developer removes each tone from the broad band test signal for an xDSL device, in conventional systems, the developer must "re-balance" the phases of remaining tones to re-achieve the desired crest factor of the test signal.

The present invention significantly overcomes these and other problems associated with conventional signal generation and device testing techniques used for testing xDSL or other types of data communication devices.

More specifically, according to embodiments of the invention, a method is provided for generating a test signal. Preferably, the test signal is used as a test signal for xDSL devices under test. The method comprises the steps of selecting a set of frequencies (e.g., a range or ranges of tones between a start and stop frequency) for the test signal and selecting frequency sub-groups from the set of frequencies. Next, the method generates a respective sub-group composite signal for each frequency sub-group selected from the set of frequencies and then time shifts each respective sub-group composite signal in relation to other sub-group composite signals. Finally, the method generates the test signal by summing each respective time shifted sub-group composite signal to produce the test signal.

In this manner, sub-group composite signals each include a respective peak which when combined with other sub-group composite signals are spread out (e.g., time-shifted or delayed) across the test signal. During missing tone tests, if a tone frequency is removed from a sub-group of frequencies, the sub-group composite signal corresponding to that frequency may be affected, but the other sub-group composite signals will remain largely unaffected by the missing tone frequency. Since the other sub-group composite signals contain peaks at the desired value (as explained below), the test signal as a whole is less affected by the missing tone. Accordingly, removal of a signal from one of the sub-groups has a small effect on the average value and generally little or no effect on the peak value of the resulting test signal.

In another embodiment of the invention, the step of selecting a set of frequencies for the test signal includes the steps of determining at least one start frequency and at least one stop frequency defining-the set of N frequencies to be included in the test signal. The method embodiments can determine start and stop frequencies, for example, by obtaining such frequencies from a test developer (e.g., a person) that controls the signal generator configured to carry out the method embodiments of the invention. The method also includes the step of determining any intermediate frequencies to be included in the test signal between the at least one start frequency and the at least one stop frequency that occur at frequency intervals equal to a desired tone spacing of frequencies for the test signal. Such intermediate frequencies include all frequencies between the start and stop frequency, or, may include a discontinuous range or frequencies. The range may be discontinuous due to a test developer selecting missing tone frequencies to be omitted from the set of frequencies used for the test signal. In this manner, a selection of missing tone frequencies that the test developer provides between the start and stop frequencies defines the remaining set of frequencies to be used in the test signal.

In yet another embodiment of the invention, the step of determining at least one start frequency and at least one stop frequency defining the set of N frequencies to be included in the test signal includes the steps of defining at least one missing tone frequency. As noted above, a test developer may specify any missing tone frequencies to be omitted between the start and stop frequencies in order to define the set of frequencies to be included in the test signal, or, a frequency selector (to be explained later) may be preprogrammed with a predetermined set of missing tone frequencies which are to be omitted or removed from the set of frequencies ranging from the start to the stop frequency. In this embodiment then, the missing tone frequency defines a frequency to be omitted from the set of N frequencies in order to produce a test signal to be used for missing tone testing of a data communications device, such that the set of N frequencies for the test signal includes a plurality of ranges of frequencies each beginning with a start frequency and ending with a stop frequency. Collectively, the plurality of ranges of frequencies defined in this manner define the set of frequencies to be used in the test signal.

In another embodiment, the step of determining any intermediate frequencies includes the step of selecting frequencies equal to carrier signals that match harmonics of a tone spacing frequency between the at least one start frequency and the at least one stop frequency. In cases in which the test signal to be used to test digital subscriber line devices, the tone spacing frequency is the frequency spacing of tones, bands or channels in the range of frequencies that a digital subscriber line device commonly uses in operation.

In still a further embodiment of the invention, the step of selecting frequency sub-groups from the set of frequencies includes the steps of determining a crest factor for the test signal and determining a desired peak value K for the test signal based on the crest factor for the test signal. The system of the invention may determine the crest factor, for example, by prompting the test developer for a desired crest factor or the system may be preprogrammed with the desired crest factor. This method embodiment also includes the step of dividing the set of frequencies for the test signal into frequency sub-groups, wherein at least one frequency sub-group contains K frequencies selected from the set of frequencies. In this manner, the set of frequencies to be used to the test signal is divided into frequency subgroups each containing substantially K (or fewer) frequencies.

In another embodiment, the step of dividing includes the steps of dividing a number N of frequencies, representing all frequencies in the set of frequencies for the test signal, by the desired peak value K to determine a number of frequency sub-groups and selecting individual frequencies from the set of frequencies to be included in each frequency sub-group. In this embodiment, the frequencies selected for each frequency sub-group are substantially selected evenly from across the N frequencies in the set of frequencies for the test signal, such that each frequency sub-group has substantially K frequencies evenly distributed across the N frequencies in the set of frequencies for the test signal. In other words, the system of the invention determines a number of frequency sub-groups by dividing the total number of frequencies by the desired peak value K, and then assigns K frequencies to each frequency sub-group. The frequencies in each sub-groups are preferably distributed substantially evenly across the entire range of frequencies in the set of frequencies for the test signal.

According to another embodiment of the invention, the step of determining a desired peak value K for the test signal includes the step of calculating the desired peak value K by multiplying the crest factor for the test signal by the average root mean square of a number N of frequencies, representing all frequencies in the set of frequencies for the test signal.

In another embodiment, the set of frequencies for the test signal is a discontinuous set of frequencies within a frequency range used for testing digital subscriber line devices and frequencies not included in the discontinuous set of frequencies are test tone frequencies that are intentionally omitted in order to perform missing tone tests on digital subscriber line devices. As noted above, the test signal to be used for missing tone testing digital subscriber line devices by selecting a set of frequencies as explained above and then establishing a set of missing tone frequencies which are removed from the set of frequencies. Alternatively, the missing tone frequencies may first be specified (e.g., by a test developer) after which the start and stop frequency spanning the range of missing tone frequencies may be specified us defining the set of frequencies which excludes the missing tone frequencies. The point is that the set of frequencies used for the test signal of the invention when performing missing tone testing includes a range of frequencies suitable for use in testing digital subscriber line devices absent any specified missing tone frequencies.

In another embodiment of the invention, the step of generating a respective sub-group composite signal for each frequency sub-group includes the step of, for each respective frequency sub-group, summing together all frequencies within that frequency sub-group to produce a respective sub-group composite signal for that frequency sub-group. In this manner, once the frequency sub-groups are established, the sub-group composite signal for each frequency sub-groups is generated according to the techniques explained herein. There is thus one sub-group composite signal for each frequency sub-group.

In another embodiment, the step of time shifting each respective sub-group composite signal imposes a predetermined delay on each respective sub-group composite signal. In one embodiment, the predetermined delay is calculated by dividing a period of the test signal by a number of frequency sub-groups squared to obtain a delay increment D. The delay increment essentially represents an amount of time in which to delay (or space) each sub-group composite signal so as to evenly distribute peak portions of each sub-group composite signal evenly across an entire period of the resulting test signal. In this embodiment, for frequency sub-groups numbered 0 through M, the predetermined delay imposed on each sub-group is equal to the delay increment D times the number 0 through M of that sub-group, such that each respective sub-group composite signal is distributed evenly within the test signal upon performing the step of generating the test signal. Thus if there are four frequency sub-groups, the first is numbered zero and the last is numbered three. The first sub-group is delayed by a delay increment have a value of zero (zero times the delay increment), the second is delayed by the delay increment exactly (one times the delay increment), the third is delayed by two times the delay increment, and the fourth is delayed by three times the delay increment.

In still another embodiment, each respective sub-group composite signal includes a peak region which occurs over a peak interval of a period of that sub-group composite signal the step of time shifting each respective sub-group composite signal offsets the peak region of each sub-group composite signal from other peak regions of other sub-group composite signals, such that the step of generating the test signal generates a test signal having multiple peak regions, each corresponding to a peak region of a sub-group composite signal which are offset from one another. Accordingly, since the frequency sub-groups are initially in-phase with each other and each has a respective peak value, the step of time-shifting the frequency sub-groups (e.g., by calculating a delay increment as in the aforementioned embodiment) causes the peak values of each frequency sub-group to be shifted out of phase with each other by an even amount of spacing across the period of these frequency sub-groups.

Accordingly, the resulting test signal having multiple peak regions evenly distributed therein can be used for missing tone testing and when additional or different missing tones are selected each time the test signal is generated in this manner, only those peak regions in the test signal corresponding to sub-group composite signals from which the missing tones are omitted have their peaks effected (e.g., lowered slightly). In other words, if a test signal is generated with a first set of missing tones from one particular frequency sub-group, the peak value for that particular frequency sub-group might be slightly effected (i.e., lowered) but the other peak signals for other frequency sub-groups would remain largely unaffected when all of the delayed (i.e., time-shifted) sub-group composite signals are collectively summed together to generate the test signal having multiple peaks. Subsequently, when a second missing tone test is to be performed using a second set of missing tone frequencies, the second set of missing tone frequencies might, perhaps, only effect the peak value of a different frequency sub-group. Accordingly, the other peak values corresponding to frequency sub-groups from which no missing tones are omitted are largely unaffected and thus the resulting test signal includes many peaks that attain and remain at a maximum value.

The unique test signal generation techniques summarized above produce test signals that have an increased chance of being sampled by a device under test at a maximum peak value (due to the multiple peak values) during missing tone testing, even though one or more peak values within test signal may correspond to a sub-group of frequencies from which missing tones are omitted.

Other embodiments of the invention include methods for testing a device. In one such embodiment, a method comprises the steps of grouping a plurality of carrier signals into sub-groups of carrier signals and generating a test signal including multiple peaks. Each peak corresponds to a respective sub-group of carrier signals. The method provides the test signal to a device under test. In this manner, the unique technique of generating the test signal is used to test a device, such as a digital subscriber line device.

Another embodiment, the method includes the step of selecting a carrier signal to omit from a sub-group of carrier signals, such that a peak in the test signal corresponding to the sub-group of carrier signals from which the carrier signal is omitted reflects the omission of the carrier signal, while other peaks corresponding to other sub-groups of carrier signals are not significantly affected by the omission of the carrier signal. As summarized above, the signal generation techniques of the invention allow a test developer to develop the test signal having such multiple peak signals without having to adjust various signal generation parameters for multiple iterations, for example, of missing tone tests in which different sets of tones are omitted during the generation of each test signal.

In yet another embodiment, the method includes the steps of receiving an output signal from the device under test. The output signal is based on the test signal. The method also performs an analysis of the output signal to determine an effect that the device under test has on the test signal in relation to the carrier signal selected for omission from the sub-group of carrier signals.

Other embodiments of the invention relate to signal generation mechanisms. One such embodiment provides a signal generation apparatus for generating a test signal. The signal generation apparatus comprises a frequency selector selecting a set of frequencies for the test signal and selecting frequency sub-groups from the set of frequencies. Generally, the frequency selector performs the method embodiments above to allow, for example, the test developer to interact with a signal generator configured according to the embodiment to specify the frequencies to be used within the test signal into further specify, if performing missing tone testing, any missing tones to be omitted from the range of frequencies used in the set of frequencies in the test signal.

This embodiment also includes at least one sub-group summer circuit coupled to the signal generation apparatus to receive the frequency sub-groups. The sub-group summer circuit(s) generate respective sub-group composite signals for the frequency sub-groups which it receives. The sub-group summer circuits therefore produce sub-group composite signals for each frequency sub-group defined by the frequency selector. A sub-group summer circuit is generally a signal summation circuit which is capable of summing multiple frequencies together to provide a single output signal. There may be a single sub-group summer circuit to which each frequency sub-group is provided in order for that single sub-group summer circuit to generate a corresponding sub-group composite signal or, alternatively, the signal generation apparatus may include multiple sub-group summer circuit's each responsible for summing the various frequencies within one or more frequency sub-groups into respective sub-group composite signals.

The signal generation apparatus further includes at least one delay shifter circuit coupled to the signal generation apparatus to receive at least one sub-group composite signal generated by the sub-group summer circuit(s). The delay shifter circuit time shifts or delays at least one sub-group composite signal in relation to other sub-group composite signals such that the sub-group composite signals for the frequency sub-groups become delayed (i.e., time-shifted) sub-group composite signals. Delay shifter circuits can delay sub-group composite signals by a delay that can range from zero to a maximum predetermined time period. Also included is a composite signal summer coupled the signal generation apparatus to receive and sum each delayed sub-group composite signal to produce the test signal.

In another embodiment, the frequency selector includes a means for determining at least one start frequency and at least one stop frequency defining the set of N frequencies to be included in the test signal. Such means can include, for example, an interface to allow a test developer to input (e.g., via a keyboard or other input mechanism) the starting stop frequencies. The frequency selector also includes a means for determining any intermediate frequencies to be included in the test signal between the at least one start frequency and the at least one stop frequency that occur at frequency intervals equal to a desired tone spacing of frequencies for the test signal. Such means can be, for example, processing circuitry or logic instructions (e.g., software code) that can calculate each required frequency for the test signal between the start and stop frequencies specified by the test developer.

In another embodiment, the means for determining at least one start frequency and at least one stop frequency defining the set of N frequencies to be included in the test signal includes a means for defining at least one missing tone frequency. The missing tone frequency defines a frequency (or multiple frequencies) to be omitted from the set of N frequencies in order to produce a test signal to be used for missing tone testing of a data communications device, such that the set of N frequencies for the test signal includes a plurality of ranges of frequencies each beginning with a start frequency and ending with a stop frequency. The means for defining at least one missing tone frequency may be, for example, the user interface that prompts a test developer to input one or more missing tone frequencies to be omitted from a test signal. Alternatively, such a means to the processing circuitry or logic instructions which predefined which missing tones are to be omitted from a test signal.

In another embodiment, the means for determining any intermediate frequencies includes means for selecting frequencies equal to carrier signals that match harmonics of a tone spacing frequency between the at least one start frequency and the at least one stop frequency. Such a means may be, for example, processing circuitry or logic instructions which perform on a processor within the signal generation apparatus to calculate the intermediate frequencies.

In another embodiment, the frequency selector includes a means for determining a crest factor for the test signal. Such a means may be, for example, an interface which prompts the test developer to enter a desired crest factor for the test signals or may be processing circuitry or logic instructions which perform on a processor within the signal generation apparatus to compute the crest factor based on other information. Likewise, this embodiment also provides a means for determining a desired peak value K for the test signal based on the crest factor for the test signal, such as processing circuitry or logic instructions, and includes a means for dividing the set of frequencies for the test signal into frequency sub-groups, wherein at least one frequency sub-group contains K frequencies selected from the set of frequencies. It is to be understood by those skilled in the art that many different types of circuitry and/or computer systems encoded logic instructions can be used to perform the collection of data and signal processing calculations explained herein.

In another embodiment, the means for dividing includes a means for dividing a number N of frequencies, representing all frequencies in the set of frequencies for the test signal, by the desired peak value K to determine a number of frequency sub-groups and a means for selecting individual frequencies from the set of frequencies to be included in each frequency sub-group. The frequencies selected for each frequency sub-group are substantially selected evenly from across the N frequencies in the set of frequencies for the test signal, such that each frequency sub-group has substantially K frequencies evenly distributed across the N frequencies in the set of frequencies for the test signal. Such means include processing circuitry or logic instructions which perform these operations within the signal generation apparatus configured in accordance with the invention.

In yet another embodiment, the means for determining a desired peak value K for the test signal calculates the desired peak value K by multiplying the crest factor for the test signal by the average root mean square of a number N of frequencies, representing all frequencies in the set of frequencies for the test signal.

In another embodiment, the set of frequencies for the test signal is a discontinuous set of frequencies within a frequency range used for testing digital subscriber line devices and frequencies not included in the discontinuous set of frequencies are test tone frequencies that a test developer intentionally omits in order to perform missing tone tests on digital subscriber line devices.

In another embodiment, the sub-group summer circuit(s) generate a respective sub-group composite signal for each frequency sub-group by summing together, for each respective frequency sub-group, all frequencies within that frequency sub-group to produce a respective sub-group composite signal for that frequency sub-group. The sub-group summer circuits to be any type of signal processing circuitry, software, or combination thereof which is capable of processing signals in this manner.

In still another embodiment, the at least one delay shifter circuit imposes a predetermined delay on each respective sub-group composite signal. As explained above, the predetermined delay offsets the peak intervals or regions within each sub-group composite signal such that when the signals are combined into the final test signal, the test signal includes multiple peak regions.

In another embodiment, the delay shifter circuit(s) calculates the predetermined delay by dividing a period of the test signal by a number of frequency sub-groups squared to obtain a delay increment D. In this case, for frequency sub-groups numbered 0 through M, the predetermined delay imposed by the at least one delay shifter circuit on each sub-group is equal to the delay increment D times the number 0 through M of that sub-group, such that each respective sub-group composite signal is distributed evenly within the test signal upon operating the composite signal summer to generate the test signal.

In another embodiment of the signal generation apparatus, each respective sub-group composite signal generated by the sub-group summer circuit(s) includes a peak region which occurs over are peak interval of a period of that sub-group composite signal and the means for time shifting each respective sub-group composite signal offsets the peak region of each sub-group composite signal from other peak regions of other sub-group composite signals, such that the composite signal summer generates a test signal having multiple peak regions, each corresponding to a peak region of a sub-group composite signal which are offset from one another.

Other embodiments of the invention include mechanisms for testing devices, such as digital subscriber line devices. In one such embodiment, a system is provided for testing a device. The system includes a test signal generator that groups a plurality of carrier signals into sub-groups of carrier signals and generates a test signal including multiple peaks, each peak corresponding to a respective sub-group of carrier signals. The test signal generator includes a test interface providing the test signal to a device under test. As explained above, since the peaks in the test signal correspond to sub-groups of carrier signals, the test signal can have multiple peak regions and is thus more likely to be sampled a peak value by a device under test.

In another embodiment, the system includes a test developer interface allowing a test developer to select a carrier signal(s) to omit from a sub-group(s) of carrier signals, such that a peak in the test signal corresponding to the sub-group of carrier signals from which the carrier signal is omitted reflects the omission of the carrier signal, while other peaks corresponding to other sub-groups of carrier signals are not significantly affected by the omission of the carrier signal. Such an embodiment allows a test developer to select different carrier signal(s) for omission from one or more sub-groups upon successor uses of the system to generate multiple test signals. Each time the test developer selects one or more of the carrier signals for omission, the system of the invention creates a test signal which remains in the desired peak value without requiring the test developer to constantly adjust attributes of carrier signals to bring the test signal up to the desired peak value, as is done in conventional systems.

In another embodiment, the test interface receives an output signal from the device under test and the output signal is based on the test signal. For example, the device under test processes the test signal generated in accordance with the invention to produce the output signal. The device under test may be, for example, the digital subscriber line device and the test signal is the missing tone test signal provided to the device under test to perform missing tone testing on the device under test. A test signal analyzer coupled to receive the output signal performs an analysis of the output signal to determine an effect that the device under test has on the test signal in relation to the carrier signal selected for omission from the sub-group of carrier signals.

Other embodiments of the invention include test signals themselves which are embodied within a carrier medium such as one or more radio frequency waves propagated within carrier mediums that can transport radio frequency waves, or one or more electrical impulses with a conductive medium such as one or more electrical wires or cables, or as one or more optical waves propagated within an optical medium such as a fiber-optic cable or other similar interface.

Specifically, one such embodiment is a propagated test signal for testing a digital subscriber line device. The propagated test signal is transported on a carrier medium such as one of the carrier mediums identified above. The propagated test signal has multiple test signal peak regions. Each test signal peak region corresponds to a peak region of a respective delayed sub-group composite signal. Each respective delayed sub-group composite signal represents a summation of a sub-group of frequencies selected from a set of frequencies selected to be included in the test signal.

In another embodiment, in the aforementioned propagated signal, the set of frequencies selected to be included in the test signal is a distribution of frequencies selected to exclude missing tone frequencies from a range of frequencies used for testing the digital subscriber line device. Such a propagated signal of such an embodiment is a missing tone test signal.

In another embodiment, a propagated test signal is provided for testing a digital subscriber line device. The propagated test signal is transported on a carrier medium. The propagated test signal has multiple test signal peak regions, each test signal peak region corresponding to a peak region of a respective delayed sub-group composite signal, and each respective delayed sub-group composite signal represents a summation of a sub-group of frequencies selected from a set of frequencies selected to be included in the test signal. Also in a propagated test signal of such an embodiment, at least one test signal peak region represents a summation of a missing-tone delayed sub-group of frequencies from which frequencies are omitted for missing tone testing of the digital subscriber line device, while other test signal peak regions represent other delayed sub-group composite signals from which no missing tone frequencies are omitted, such that the other test signal peak regions are substantially unaffected by the omission of frequencies from a missing tone delayed sub-group of frequencies. In this manner, such a signal contains multiple peak regions, some of which (e.g., one or more) may reflect the omission of missing tone frequencies from the test signal, while other peak regions do not substantially reflect the omission of such tones.

The aforementioned embodiments of the invention may be performed, produced or otherwise created or used by mechanisms manufactured and/or sold by Teradyne, Inc. of Boston, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis-instead being placed upon illustrating the principles of the invention.

DETAILED DESCRIPTION OF PREFERRED EMBODIMENTS

Embodiments of the invention include new mechanisms and techniques for generating a test signal, such as an ADSL test signal, which allows a test developer to independently control the tones of the test signal and the overall crest factor of the test signal. Using a process of the invention, tones can be removed from a test signal without significantly affecting the signal's crest factor. The conventional trial and error process of manually adjusting tones is therefore replaced with a deterministic process, greatly reducing test development time.

To accomplish these goals, the invention is based in part on the observation that a sequence of cosine waves (e.g., that represent different tones, bands, frequencies or channels in an xDSL signal) having zero phase difference, the same amplitude, and harmonically related frequencies, add together to approximate an impulse function that repeats every 2-pi radians.

Figure 1:
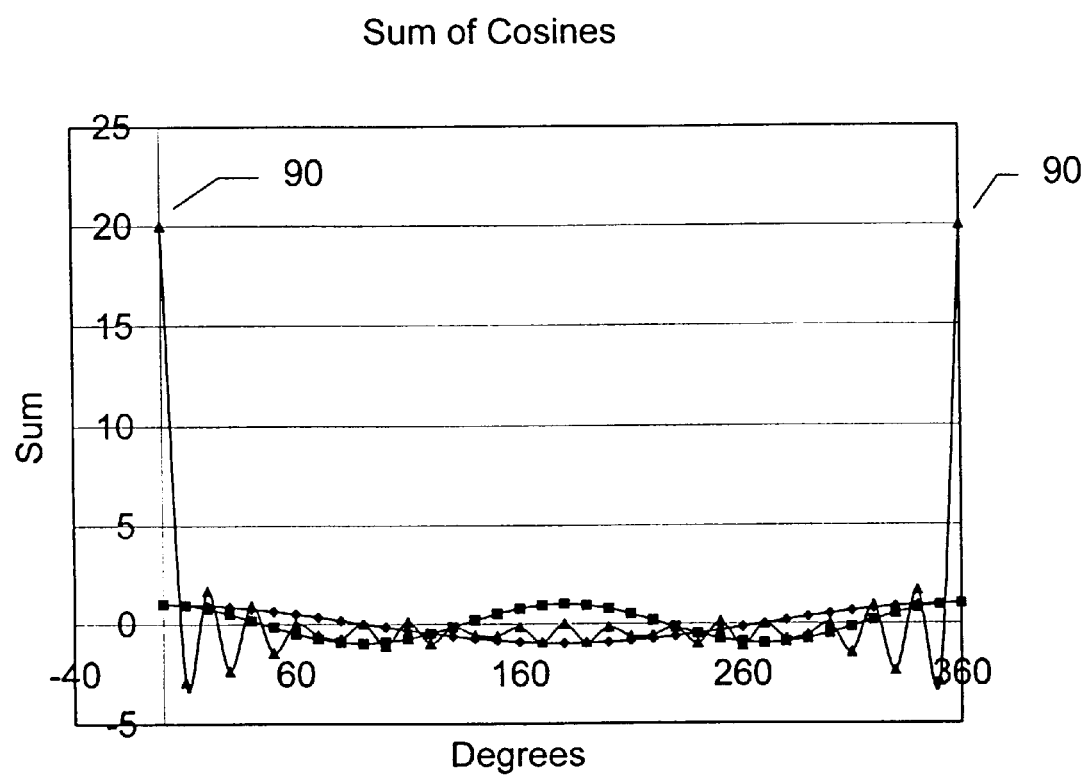
FIG. 1 illustrates an example of a plurality of carrier signals represented by cosine waves which are in phase with each other and which are combined to produce a sub-group composite signal that has a peak region residing within a relatively small peak interval portion of the overall period of the sub-group composite signal.

FIG. 1 illustrates an example of this principle in which a sub-group of twenty cosine waves (e.g., that represent a sub-group of carrier signals or frequencies selected from the available bands, channels or tones in an xDSL test signal) with zero phase between them, ranging from cos(x) to cos(20x), are added together to produce the sub-group composite signal called SUM.

It should be noted that the peak value of the sub-group composite signal SUM, (shown at location 90 in FIG. 1) is 20, which equals the number of waveforms (i.e., a carrier signal for each respective frequency tone in the sub-group of selected tones) that are added together to make up SUM. It should also be noted here that the peak value of the resulting sub-group composite signals occurs for only a short duration in the very beginning and at the very end of the overall SUM signal wavelength from 0 to 360 degrees. In general, the addition of N cosine waves having zero phase difference between them has a peak value of N. An equation for the average value of the sub-group composite signal SUM, also known as a root-mean-square or RMS value, is the square root of (N/2), or:

$$\text{Average RMS} = \sqrt{(N/2)}$$

From the graph in FIG. 1, it should be apparent that the peak value 90 of the sub-group composite signal SUM appears during a small portion of the overall sub-group composite signal wavelength or period from zero to 2 pi, while the remaining non-peak portions of the sub-group composite signal SUM in other areas of the overall period do not reach anywhere close to the peak interval value and are relatively flat.

At a high-level, in this invention, to generate an input waveform as a test signal for missing tone testing of xDSL or other types of devices, a test developer specifies a frequency range that includes a start frequency, a stop frequency, and a crest factor. The start and stop frequencies designate an entire set (e.g., a range) of N frequencies, tones, bands or channels within the bandwidth of an xDSL signal (e.g., about 250 bands for ADSL) and therefore designate which tone frequencies to initially be included in the input waveform. In other words, all carrier signals that match harmonics of the tone spacing frequency (4.3125 kHz for ADSL) between the start frequency and the stop frequency are initially included as tones (i.e., before a test developer selects "missing tones" to be dropped or omitted from the test signal) in the test signal. Preferably, the set of tones between the start and stop frequencies is continuous, though the test developer may specify several start and stop frequencies in which case the set of frequencies used for the test signal may be discontinuous or spread out across a range of tones.

Next, the system of the invention determines a desired peak value of the entire test signal based on crest factor (e.g., obtained from test developer input). If N equals the total number of different frequencies that constitute the test signal, then the desired peak value is set to K, where:

$$K = \text{Crest Factor} * \text{Average RMS} = \text{Crest Factor} * \sqrt{(N/2)}$$

Next, to achieve an overall desired test signal peak value of K, the systems and techniques of the invention divide the input waveform having a total of N frequencies into different sub-groups of frequencies having at most K frequencies each. Thus, after the test developer specifies a number of frequencies N for the test signal, the system of the invention creates sub-groups of frequencies selected from the entire set of frequencies between the start and stop frequencies. Depending upon the value of N, there will always be at least one sub-group having K frequencies, although one or more sub-groups may have fewer than K frequencies. For example, for ADSL or VDSL, each sub-group of K (or fewer) frequencies may contain a range of frequencies with tone spacing equal to 4.3125 kHz times the number of groups. To select which frequencies go into each sub-group, the system of the invention preferably selects frequencies for a sub-group that are distributed K-tones apart across the total range of N frequencies.

For example, if a test developer selects a start tone of 1 and an end tone of 70, then there are 200 frequencies in the entire test tone range, so N equals 200. Assuming that the amplitude of each frequency is 1, and the test developer specifies a desired crest factor for the test signal of 5, then the invention determines the desired peak value K for the test signal using the formula:

$$K = \text{Crest Factor} * \text{Average RMS} = \text{Crest Factor} * \sqrt{(N/2)}$$

as follows:

$$K = 5 * \sqrt{(200/2)}$$

$$K = 5 * 10$$

$$K = 50.$$

Thus there are K or fifty (50) frequencies in each sub-group. Accordingly, the system of the invention divides the two hundred (200) frequencies in the entire test range of frequencies into sub-groups of K (50) frequencies each (or 200/50=4 sub-groups), so that there are four (4) sub-groups of fifty (50) frequencies each. The fifty (50) different tone frequencies in each sub-group are preferably distributed evenly across the N frequencies. All of the frequencies within each group have zero (0) phase difference between them such that they all are in a sense "overlaid" on top of one another.

Next, the system of the invention creates a respective sub-group composite signal for each frequency sub-group by summing together the frequencies in each sub-group. In the above example then, the system of the invention creates four (4) sub-group composite signals, one for each sub-group of fifty (50) frequencies each. Using the formulas given above, and assuming for this example that each individual tone frequency signal has an amplitude of one (1), then in this example, the peak value of each sub-group composite signal is fifty (50), and the average or RMS value for each sub-group is five (5) and the crest factor for each sub-group composite signal is ten (10).

Next, to achieve the desired crest factor (PAR) for the entire test signal (i.e., for the entire set of tones within all four sub-groups), the system of the invention distributes or shifts in time the four (4) sub-group composite signals with respect to each other and then sums the shifted sub-group composite signals together to produce the test signal. The sub-group composite signal for each sub-group of frequencies provides a peak value for only a relatively short peak time interval compared with the overall period of that sub-group composite signal. However, since the sub-group composite signals are shifted in time (e.g., via a delay circuit) with respect to each other, the peaks of the four sub-group composite signals (four in this example) are spread out from each other over the entire the test signal to create many (in this case, four) areas where a peak signal exists in the test signal.

The peak value of a single sub-group composite signal is generally representative of the desired value of the peak of the overall test signal. Since there are multiple peak values or regions, one for each sub-group composite signal, that reflect the desired test signal peak value, when a test operator uses a signal generator of the invention for missing tone testing, tones removed from a single sub-group only affect the peak value corresponding to that sub-group only, while other peak values for the other sub-groups remain at the peak value level as desired for the test signal. Besides the peak portions of each sub-group composite signal, the remaining portions of the sub-group composite signals (e.g., the non-peak portions or regions in the example sub-group composite signal in FIG. 1 above) are relatively flat and thus do not significantly interfere with the other sub-group composite signals with which they are combined. Since the system of the invention time-shifts the sub-group composite signals from one another before (or while) combining (e.g., summing) them, their respective peaks will be distributed evenly across different sections of the entire period of the test signal and will thus create a test signal that has many peak values or regions, one per sub-group composite signal.

Figure 2:
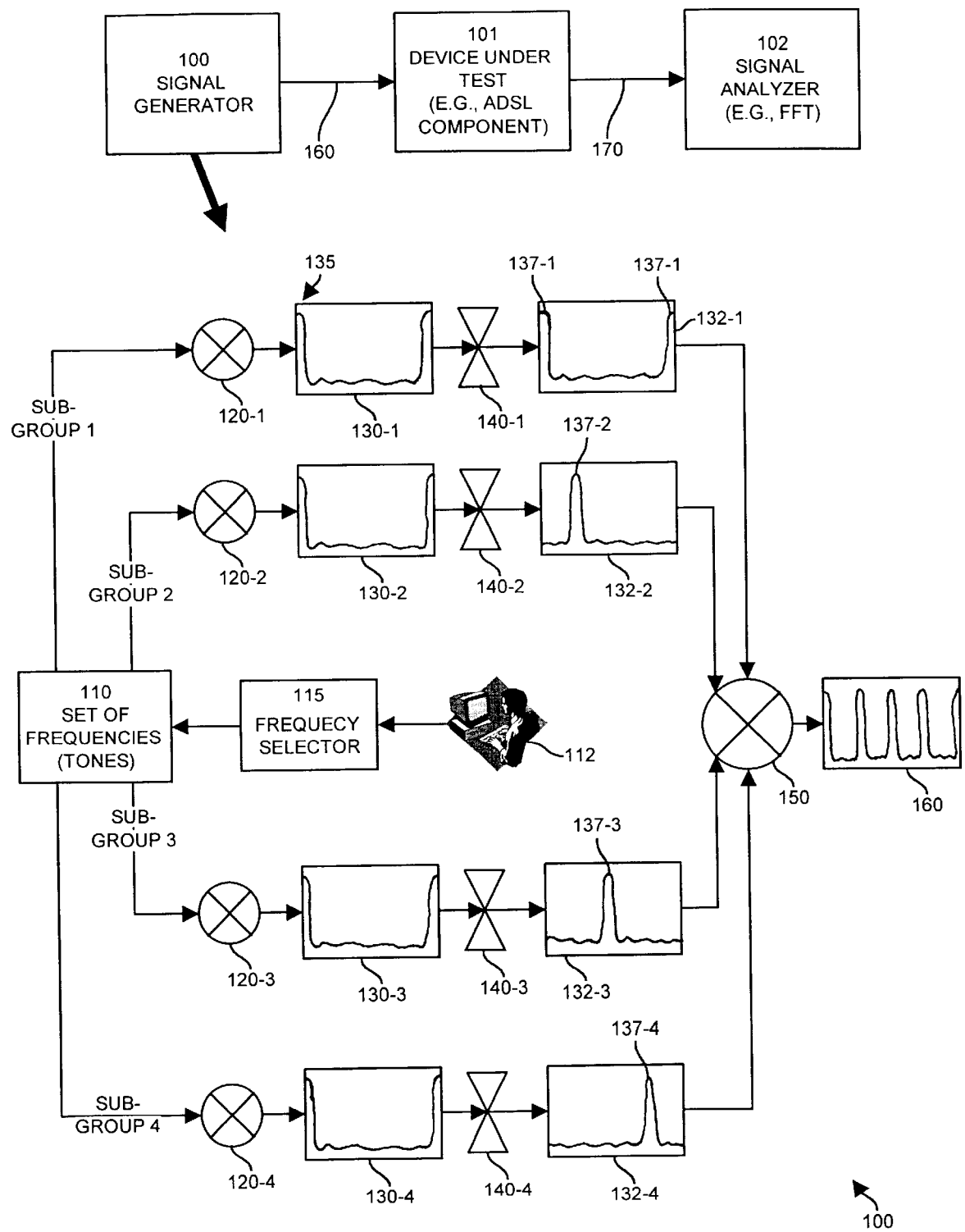
FIG. 2 illustrates a block diagram of a test architecture including a composite signal test generator configured in accordance with embodiments of the invention to provide a test signal to a device under test.

FIG. 2 illustrates an example schematic architecture of a test system and signal generator 100 configured according to the invention. As shown at the top of FIG. 2, the example high-level schematic architecture includes a signal generator 100 coupled to a device under test 101, which is in turn coupled to a signal analyzer 102. In operation, the signal generator 100 provides a test signal 160, created according to the invention, to the device under test 101 which processes the test signal 160 to produce the output test signal 170. A signal analyzer 102 such as an Fast Fourier Transform (FFT) circuit or FFT processing algorithm processes the output test signal 170 to determine distortion components at locations of missing tones within the output test signal 170.

The lower portion of FIG. 2 shows an example schematic circuit diagram that illustrates some details of the signal generator 100. This example is not meant to be limiting.

The example circuitry within the signal generator 100 includes a frequency selector 115, sub-group summers 120, delay shifter circuits 140, and a composite signal summer 150. In operation of the example signal generator 100 in accordance with the invention, a test developer 112 selects a set of frequencies 110 via interfacing with the frequency selector 115 to be used to create the output test signal 160. The set of frequencies 110 may include a continuous range of frequencies, or may be two or more ranges of frequencies which are delineated or divided by a selection of missing tones that the test developer 112 selects to not be included in the set of frequencies 110, in order to perform missing tone testing of xDSL devices.

As explained above, in operation, after the test developer 112 operates the frequency selector 115 to select the set of frequencies 110, the frequency selector 115 divides the set of frequencies 110 into sub-groups of frequencies (sub-group 1 through sub-group 4, in this example) which are input into respective sub-group summers 120-1 through 120-4. The sub-group summers 120-1 through 120-4 produce respective sub-group composite signals (sub-group composite signal 1 through sub-group composite signal 4 in this example) which are generally shown graphically as waveforms 130-1 through 130-4. The sub-group composite signals 130 are then input into respective delay shifter circuits 140-1 through 140-4 which each induce different amounts of delay into the respective sub-group composite signals 130 to produce delayed sub-group composite signals shown graphically as waveforms 132-1 through 132-4. It is noted here that the peak values 137-1 through 137-4 of the delayed sub-group composite signals 132 are offset from each other in time, as shown by comparing the horizontal locations of the peak 137 of each delayed sub-group composite signals 132 vertically, in relation to the others in this figure. The delayed sub-group composite signals 132 are then input into the composite signal summer 150 which combines the respective delayed sub-group composite signals to produce the final output test signal 160.

As shown in FIG. 2, each sub-group composite signal 130-1 through 130-4 includes a peak value (e.g., 135) which appears over a relatively small portion of the overall period of the sub-group composite signal 130. When the delay shifter circuits 140-1 through 140-4 each induce a respective delay into a respective sub-group composite signal 130 to produce the delayed sub-group composite signals 132, the peak value 137 of each sub-group composite signal, as previously noted, is offset in time from the peak values of the other delayed sub-group composite signals 132. When the composite signal summner 150 sums the respective delayed sub-group composite signals 132, the peaks 137 of each respective sub-group composite signal do not overlap, but rather, are evenly distributed over the period of the final output test signal 160 (as shown by multiple peaks 138-1 through 138-4 within the waveform in the test signal 160 in FIG. 2). As such, the test signal 160 includes multiple regions which attain (or are at) a peak value.

Accordingly, if missing tone testing is performed with the circuitry shown in FIG. 2, a delayed sub-group composite signal (e.g., 130-1) that represents a sub-group of frequencies which have one or more missing tones produces a peak value (e.g., one of 138-1 through 138-4 when combined within test signal 160) that is slightly lower than the other peaks 138 corresponding to other delayed sub-group composite signals 132 which may have no missing tones. However, since all of the sub-group composite signal peak values 137 are evenly distributed (due to delay shifter circuits 140) as test signal peaks 138 across the period of the final test signal 160, the peak regions 138 within the test signal 160 produce little interference with one another. This is because, generally, each of the respective delayed sub-group composite signal peak values 137 is present as a test signal peak 138 in a different location (138-1 through 138-4) across the period of the wavelength of the test signal 160. Moreover, since the remaining non-peak portions of each sub-group composite signal are relatively flat, when they are delayed (via delay shifters 140) and then summed (via composite signal summer 150), they do not significantly combine to adversely affect the final output test signal 160 at either the test signal peak locations 138 of those other delayed sub-group composite signals 132 or at other flat locations of such signals, when combined in the test signal 160.

Accordingly, the system of the invention constructs a test signal waveform 160 that superimposes the composite signals of different sub-groups of K (or fewer) tones, and shifts or delays each sub-group composite signal in time with respect to the others. The resulting delayed sub-group composite signal peaks 137 offset in time from one another fill the unused (i.e., flat portions) intervals between peaks of respective other delayed sub-group composite signals 132, but are not so close together that the peaks 138 interfere with each other. Moreover, the flat portions of each sub-group composite signal do not significantly effect other sub-group composite signal peaks or flat portions.

By constructing the test signal input waveform according to this technique, individual tones can be removed from the input waveform without substantially affecting either peak or PAR of the overall test signal 160. For instance, dropping a single tone causes a single peak 135 of one of the sub-group composite signals 130 within the overall test signal (test signal peaks 138) to change by one, say from 50 to 49 as in the above example. However, all of the other peaks 135 of the other sub-group composite signals 130 remain the same and are largely unaffected when delayed and combined in the test signal 160 (as peaks 138) by the missing tone in one of the sub-group composite signals 130. Thus, the average value of the test signal waveform 160 does not change much due to the dropped tone, because the average value of the test signal is determined principally by the number of tones in the set of frequencies 110. In other words, when sampling the test signal 160 after dropping one or more tones, only those peaks 135, 137 and 138 that correspond to a sub-group composite signal 130 having missing tones will be affected (e.g., lowered slightly) with a lower peak. As in the above example, if there are four sub-groups and tones are dropped from one sub-group, there are three peak values 138 in the test signal 160 that remain largely unaffected and thus the chances of sampling a peak value 138 in the test signal are greater since three peak signals 138 remain unchanged. If PAR of the test signal 160 does slightly change as a result of dropping a tone (or tones) from the set of frequencies 110, the change can be easily compensated by specifying a slightly larger value for PAR, and rerunning the process (i.e., by tweaking it up).

It should be understood that testing of xDSL devices may be performed using the techniques explained above to provide xDSL test signals 160 that include an intentional omission of one or more missing tones. When an xDSL device under test receives such a test signal 160 and processes the test signal, the resulting output signal 170 can be analyzed by an FFT 102 to determine distortion or other signal components that may or may not exist at locations of the missing tones. Subsequent testing using different sets of removed tones may then be performed in which case the test signal for the test is also created using the system of the invention as explained above such that no matter which tones are removed during the creation of multiple test signals, each test signal may be created according to the invention such that the test developer need not spend significant amounts of time attempting to get each test signal to have desired peak values and crest factors. In other words, when testing an xDSL device using multiple test signals, each having different sets of tones removed, the system of the invention can be used to develop each test signal in accordance with the invention to save test developer time in obtaining a proper test signal.

Figure 3:
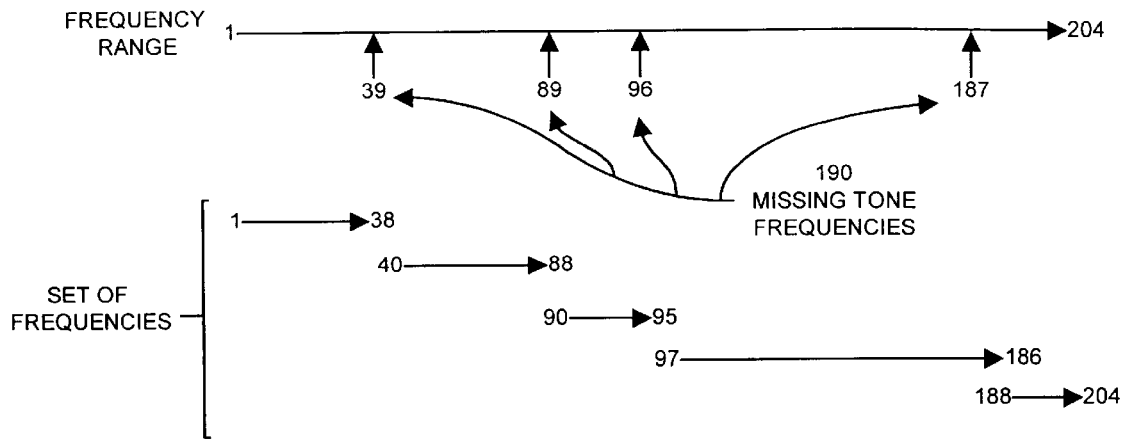
FIG. 3 illustrates an example of a selection of missing tone frequencies from a frequency range resulting in a set of frequencies to be used for the generation of a test signal in accordance with embodiments of the invention.

FIGS. 3 illustrates an example of a set of frequencies used for missing tone testing of xDSL devices. In this example, a test developer (not shown) selects a range of frequencies numbered in this example between 1 and 204 to be included in a test signal that a signal generator (e.g., 100 in FIG. 2) will provide to a device under test (e.g., 101). The test developer also selects various missing tone frequencies 190. In this example, frequencies corresponding to locations 39, 89, 96 and 187 are selected for removal (i.e., are selected as missing tone frequencies) from the set of frequencies ranging from 1 to 204. The resulting set of frequencies is the discontinuous set having values of 1 . . . 38, 40 . . . 88, 90 . . . 95, 97 . . . 186 and 188 . . . 204. There are 200 different frequencies in the example set of frequencies shown in FIG. 3. In a preferred embodiment, the set of frequencies used for the test signal is a discontinuous set of frequencies such as that shown in FIG. 3 that exist within a frequency range used for testing digital subscriber line devices. The missing tone frequencies not included in the discontinuous set of frequencies are test tone frequencies that are intentionally omitted in order to perform missing tone tests on digital subscriber line devices.

Figure 4:
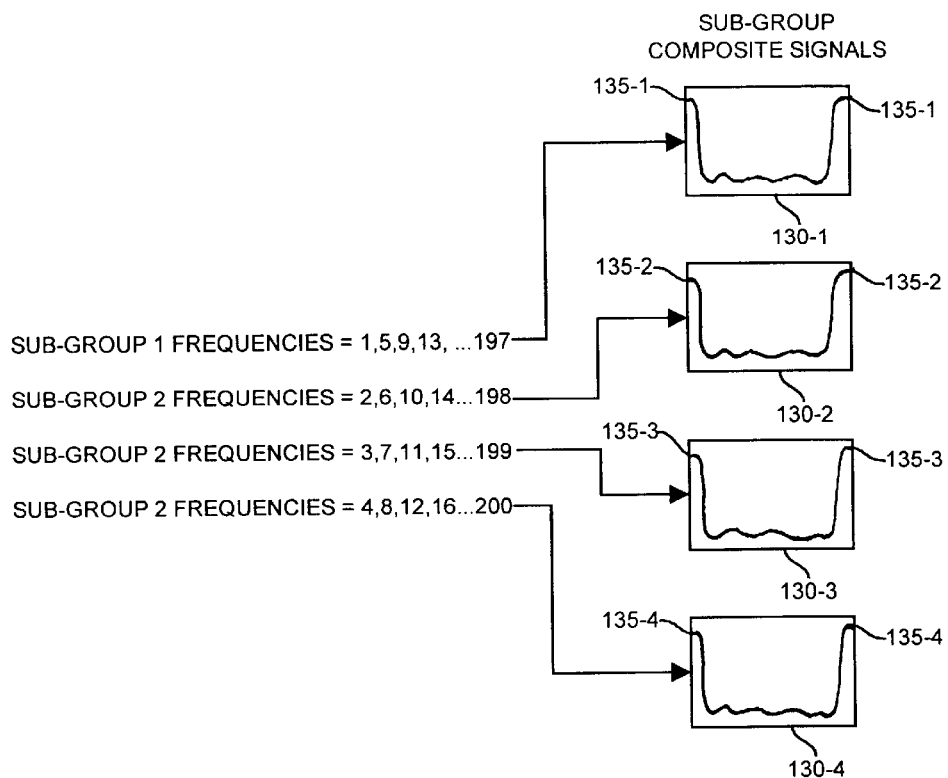
FIG. 4 illustrates how the set of frequencies selected in FIG. 3 can be divided into frequency sub-groups for which respective sub-group composite signals are generated according to embodiments of the invention.

FIG. 4 illustrates how the system of the invention divides the set of 200 different frequencies to be included in the test signal into frequency sub-groups, and then for each frequency sub-group, uses the sub-group composite summers 120-1 through 120-4 (FIG. 2) to generate respective sub-group composite signals 130-1 through 130-4 for each respective sub-group of frequencies. Of particular importance in this example is that the individual frequencies selected for each frequency sub-group are substantially distributed evenly across the entire set of 200 frequencies. In other words, the frequencies in a particular sub-group represent an even distribution of frequencies selected from across the entire set of frequencies. As such, each frequency sub-group has substantially the same number of frequencies which are evenly selected across the set of frequencies to be used for the test signal.

Once the frequency selector 115 selects the frequencies for the sub-groups in this manner, the sub-group summers 120 sum together the carrier signals for each frequency in a sub-group to create the sub-group composite signals 130-1 through 130-4. Of particular importance to this aspect of this example illustration is that each respective sub-group composite signal 130-1 through 130-4 includes a peak region or interval 135-1 through 135-4 which occurs over a peak interval of the period of that sub-group composite signal 130 which is relatively short as compared to the total period of that subgroup composite signal 130. While not shown in FIG. 4 (but as shown in FIG. 2), once each sub-group composite signal 130 has been created in this manner, the system of the invention inserts a predetermined delay into certain of sub-group composite signals 130 (e.g., delays sub-group composite signals 2, 3 and 4 in this example) in order to offset the peak intervals 135 from each other.

Figure 5:
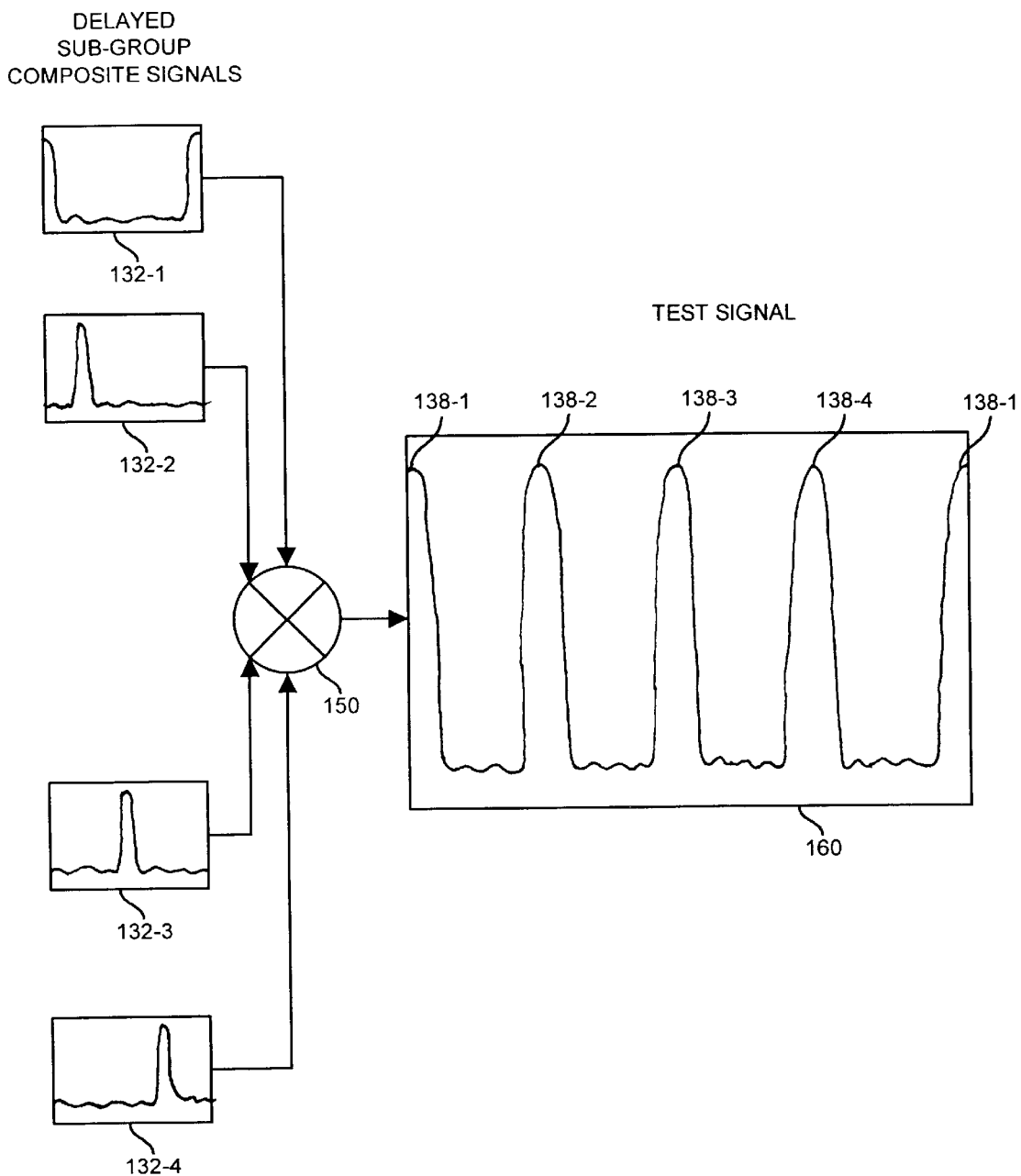
FIG. 5 illustrates in more detail how a number of delayed sub-group composite signals may be combined to produce a test signal having multiple peak regions in accordance with embodiments of the invention.

FIG. 5 illustrates in more detail how the composite signal summer 150 in the signal generation system 100 of the invention (FIG. 2) sums together each of the delayed sub-group composite signals 132-1 through 132-4 to produce the test signal 160 which is then input to the device under test. In particular, each peak interval or peak region 137-1 through 137-4 in each delayed sub-group composite signal 132 is shifted to a different portion of the entire period of the test signal 160, as test signal peak regions or intervals 137-1 through 137-4.

Of particular importance to the example illustrations in FIGS. 3 through 5 is the fact that the missing tone frequencies 190 (e.g., frequencies 39, 89, 96 and 187 in this example) do not create a significant impact on the peak values 136 in the test signal 160 output to the device under test 101. By way of example, if the test developer 112 were to select other missing tone frequency (in addition to those already selected) for removal to perform further missing tone testing of a device under test, removal of the additional missing tone would only (possibly) slightly affect a peak value 135 of just one of the sub-group composite signals 130. The other sub-group composite signals 130 corresponding to sub-groups of frequencies unrelated to (i.e., that did not contain) the additional missing tone would remain unchanged. As such, in this example, three of the four peak values 138 in the test signal 160 that are input to the device 101 would remain essentially unchanged (i.e., at full peak). Therefore, the average peak value of the test signal 160 would remain largely unaffected. This aspect of the system of the invention allows a test developer 112 to systematically remove tones from the set of frequencies 110 to perform missing tone testing without having to completely recalibrate the resulting test signal 160 since the peak values 138 of the test signal 160 remain largely unaffected.

Figure 6:
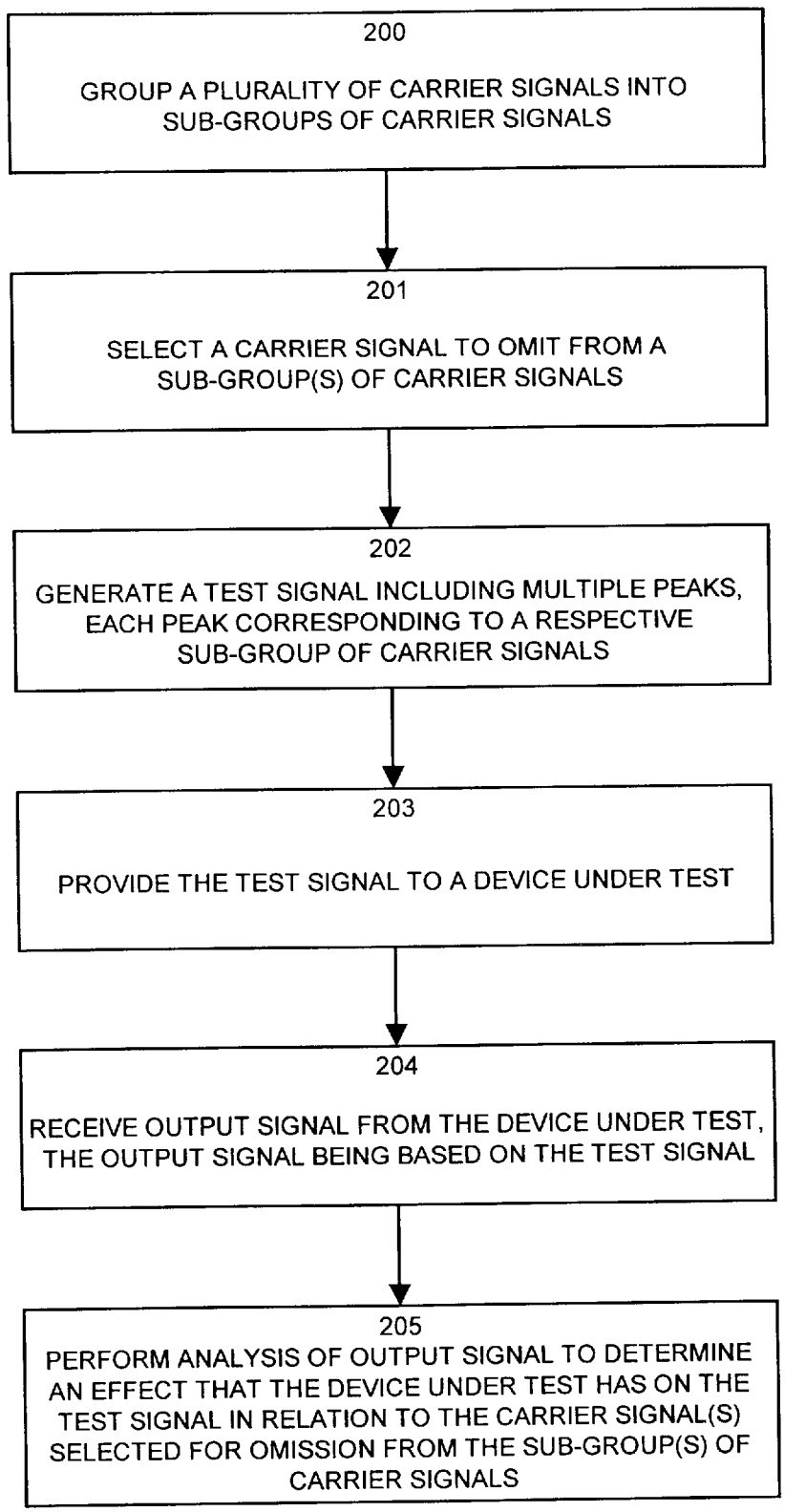
FIG. 6 is a flow chart of processing steps performed to test the device using a test signal generated according to embodiments of the invention.

FIG. 6 illustrates a flow chart of processing steps performed by the system of the invention to test a device using the aforementioned signal generation architecture (e.g., 100 in FIG. 2, the system of the invention) which operates according to the general principles and techniques outlined above.

In step 200, the system of the invention (e.g., the frequency selector 115) groups a plurality of carrier signals into sub-groups of carrier signals.

Next, in step 201, a test developer 112 interacts with the system of the invention (e.g., via an interface to the frequency selector 115) to select one or more carrier signals to omit from a sub-group(s) of carrier signals. Such omitted carrier signals may correspond, for example, to missing tone frequencies used for missing tone testing of xDSL devices.

In step 202, the signal generation system of the invention (100 in FIG. 2) generates the test signal (e.g., 160) that includes multiple peaks (e.g., 138), wherein each peak corresponds to a respective sub-group of carrier signals. In this manner, the multiple peaks within the test signal that correspond to the respective individual peaks (e.g., sub-group composite signal peaks 135-1 through 135-4) are each more likely to remain in their peak values irrespective of which missing tone frequencies are omitted (step 201) from the overall set of frequencies used for the test signal.

In step 203, the system of the invention provides the test signal to a device under test, such as an xDSL device. At this point, the device under test (e.g., 101 in FIG. 2) processes the test signal 160 according to device functionality.

Once the device under test 101 processes a test signal 160 generated by the signal generator system 100 in this manner, the test system of the invention, in step 204, receives the output signal 170 from the device under test 101.

Finally, in step 205, the system of the invention performs an analysis (e.g., an FFT) of the output signal 170 to determine an affect the device under test 101 has on the test signal 160 in relation to the tone frequency carrier signals selected for omission from the sub-groups of carrier signals. In this manner, the system of the invention can be used to perform missing tone testing of xDSL data communications devices.

Figure 7:
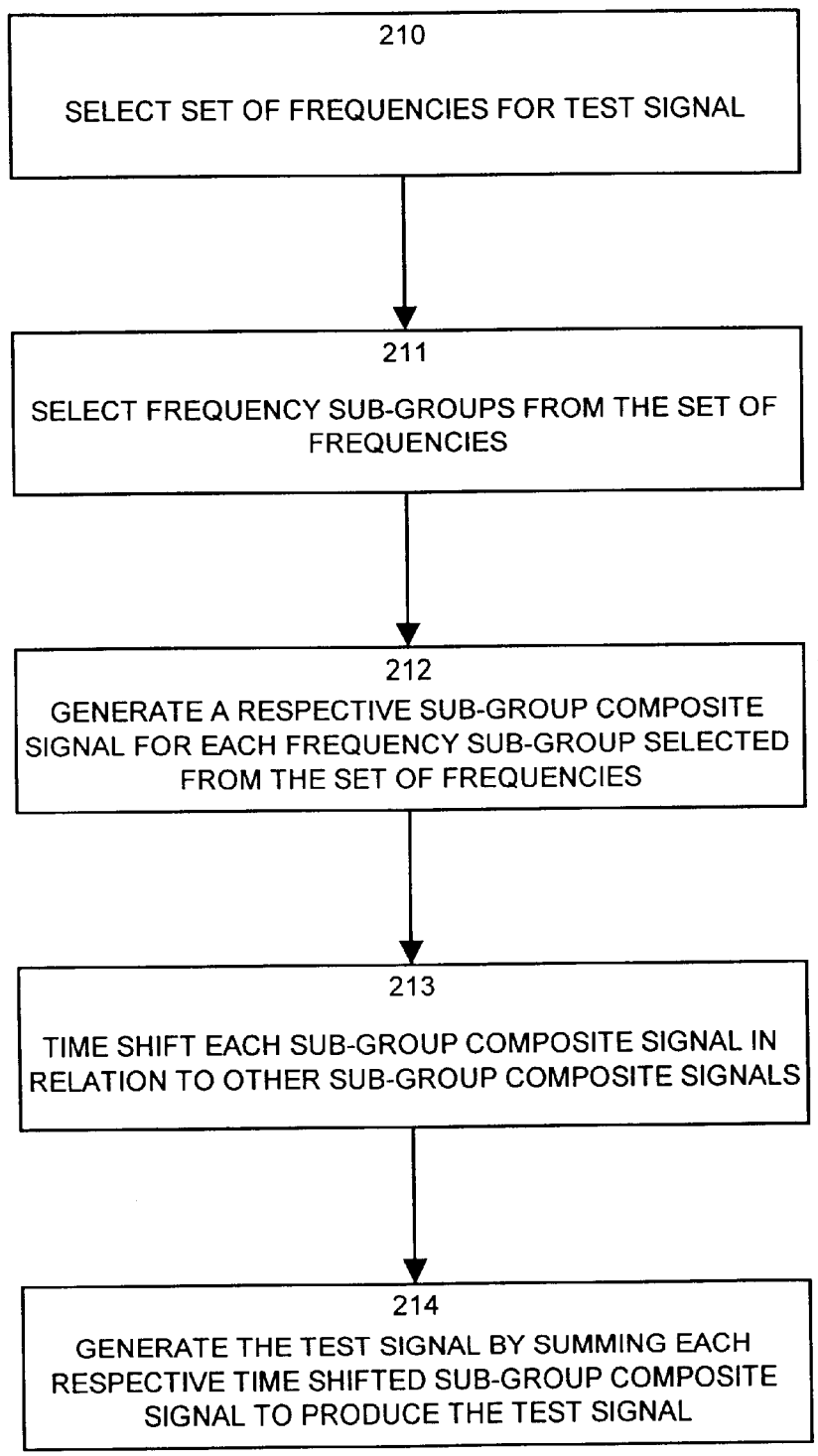
FIG. 7 is a flow chart of processing steps showing the details of processing performed according to embodiments of the invention to generate a test signal.

FIG. 7 shows a high-level flow chart of processing steps performed by a signal generation system configured in accordance with embodiments of the invention to generate a test signal, such as test signal 160 in the aforementioned examples. While FIG. 7 shows test signal generation and high-level, details of the operation of certain steps within FIG. 7 will be described in more detail with respect to the flow charts of processing steps in FIGS. 8 through 10.

In step 210 in FIG. 7, the signal generation system of the invention selects a set of frequencies to be used for the test signal. As previously explained, a test developer 112 may select a number of frequencies to be combined into a single test signal 160 for use in testing xDSL devices. The set of frequencies 110 used for the test signal, as selected, for example, by the system of the invention under control of a test developer in step 210, can exclude (i.e., may not contain) one or more intentionally omitted frequencies which correspond to missing tone carrier frequencies in the case that the test signal is to be used for missing tone testing of xDSL devices.

It is to be understood that it is not required that missing tones be specified by the test developer or within the system of the invention, in which case the system of the invention creates a test signal that omits no missing tones but which still has multiple peak values 138 as explained herein. In other words, embodiments of the invention are not limited to use in missing tone testing, and can be used to provide xDSL signals 160 that include multiple peak regions 138 with no tones removed or missing from such signals 160.

In step 211, the operation of the signal generation system of the invention selects frequency sub-groups from the set of frequencies selected in step 210. As previously explained with respect to the example signal generation design 100 in FIG. 2, the system of the invention in step 211 essentially divides the set of frequencies 110 selected in step 210 into substantially equal numbered groups of frequencies (frequency sub-groups) which each contain frequencies that are spread out or selected across the entire range of frequencies within the set of frequencies 110 selected in step 210.

In step 212, the signal generation system of the invention generates a respective sub-group composite signal 130 for each frequency sub-group selected for the set of frequencies and steps 211 and 210. In other words, in step 212, the system of the invention generates a separate sub-group composite signal 130 for each frequency sub-group by summing together all frequencies within a sub-group. Each sub-group composite signal 130 therefore contains, as explained above, the peak value 135 that occurs over a relatively short peak interval of the overall period for that sub-group composite signal 130.

Next, in step 213, the system of the invention time shifts each sub-group composite signal 130 in relation to the other sub-group composite signals. This operation has the effect of offsetting the peak intervals 135 for each sub-group composite signal 130 from other peak intervals of other sub-group composite signals. In other words, after processing step 212, each sub-group composite signal 130 becomes a delayed sub-group composite signal 132 that contains a peak value 137 expressed over the peak interval which occurs, for example, at the very beginning and end of the period of the sub-group composite signals. However, after processing step 213, such peak values 137 are offset in time for one another such that if each sub-group composite signal (e.g., 130-1 through 130-4) were to be overlaid on top of one another, the peak intervals 137 of each delayed sub-group composite signal 132 would occur at different locations throughout the overall period of the resulting overlaid signal.

To this end, the signal generation system 100 of the invention in step 214 generates the test signal 160 by summing together (i.e., overlaying) each respective delayed sub-group composite signal 132 to produce the resulting test signal 160. As just explained, since each independent sub-group composite signal 130 contains a peak value 135 expressed over a peak interval in a relatively short amount of the total period for each sub-group composite signal, and each sub-group composite signal is shifted in time from one another as delayed sub-group composite signals 132, when combined in step 214, peak values 137 from each delayed sub-group composite signal 132 do not substantially interfere with one another and thus the test signal 160 output as a result of processing step 214 substantially fully expresses or contains the peak values 138 for each respective sub-group composite signal. Moreover, since the non-peak portions of each sub-group composite signal are substantially flat, when each sub-group composite signal is delayed and then combined into the final resulting test signal 160, the non-peak portions do not substantially sum together to cause interference with other portions (e.g., peak interval portions 138) in the test signal, not do they combined to create significant test signal portions themselves. In other words, the combination of the flat areas of each delayed sub-group composite signal have little combined effect on peak and non-peak portions in the resulting test signal 160.

Figure 8:
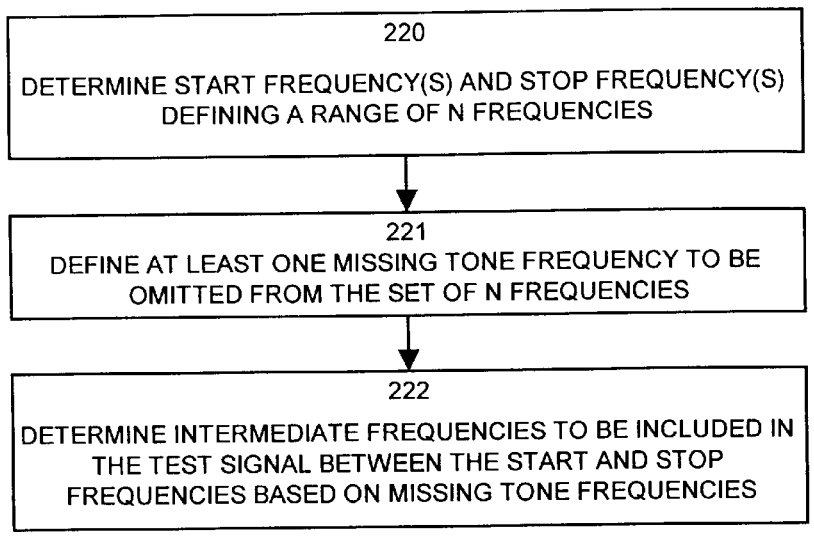
FIG. 8 is a flow chart of processing steps performed according to embodiments of the invention to select the set of frequencies used in the test signal.

FIG. 8 provides a flow of processing steps which show an example of the details of operations involved to select a set of frequencies to be used for the test signal, as performed by embodiments of the invention in step 210 of FIG. 7.

In step 220, the system of the invention (e.g., the frequency selector 115) allows a test developer 112 to determine one or more start and stop frequencies which define a set of N frequencies to be used within the test signal. For example, with respect to the example previously discussed in FIG. 2, a test developer may use the system of the invention to specify the frequencies from numbered 1 to 204 to perform missing tone testing of an xDSL device.

Next, system of the invention in step 221 allows the test developer to define or specify at least one missing tone frequency to be omitted from the set of N frequencies determined or selected in step 220.

Finally, in step 222, the system of the invention determines (e.g., via automated logic processing) any intermediate frequencies to be included in the test signal which exist between the start and stop frequencies based upon the missing tone frequencies as also specified by the test developer. That is, according to the order of steps as shown in FIG. 8, the test developer can specify the start and stop frequency to define an entire range of frequencies and then can specify the missing tones to be excluded from that range. The system of the invention then, in step 222, can remove the specified missing tones in order to define a plurality of sub-ranges of frequencies which define the entire set of N frequencies to be used in the test signal. This is illustrated in FIG. 2 which shows the set of frequencies to be a composition of smaller contiguous ranges of frequencies delineated by missing tones, rather than one single contiguous range.

It is to be understood that the order of steps 220 and 221 are generally independent of one another. That is, embodiments of the system of the invention are contemplated that allow a test developer to first select a set of missing tones to be excluded from the set of frequencies that are specified thereafter. The point is that the system of the invention in step 210 of FIG. 7 allows a test developer to select or specify a number N of frequencies to be used as the set of frequencies for the test signal.

Figure 9:
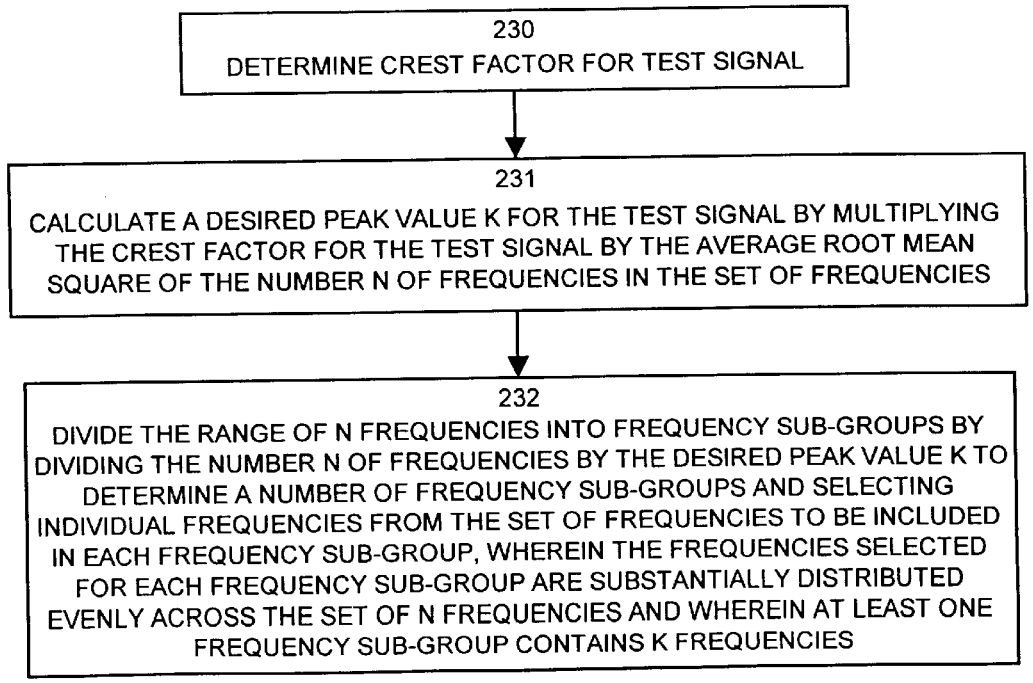
FIG. 9 is a flow chart of processing steps performed to select frequencies for the frequency sub-groups used in embodiments of the invention.

FIG. 9 illustrates a flow chart of processing steps 230 to 232 which show in more detail an example of processing operations performed by the system of the invention within step 211 of FIG. 7 and steps 220 through 222 in FIG. 8 to select the frequency sub-groups from the set of frequencies to be used for the test signal.

In step 230, the signal generation system of the invention determines the crest factor to be used for the test signal. In a preferred embodiment, the system of the invention determines the crest factor by prompting the test developer 112 to enter a desired crest factor into an interface (not specifically shown) provided by the frequency selector 115.

Once the test developer has entered a desired crest factor (step 230), in step 231 the system of the invention calculates a desired peak value K for the test signal 160 by multiplying the crest factor for the test signal by the average root mean square of the number N of frequencies in the set of frequencies 110. Specifically, in step 231, the system of the invention can compute the average root mean square using the root mean square formula explained above. This result can then be multiplied by the crest factor to obtain the desired peak value K for the test signal.

Next, in step 232, the system divides the set of N frequencies 110 into frequency sub-groups by dividing the number N of frequencies in the set of frequencies 110 by the desired peak value K to determine a number of frequency sub-groups, and then selects individual frequencies from the set of frequencies to be included in each frequency sub-group. The frequencies that the invention selects for each frequency sub-group are preferably substantially selected as an even distribution across the set of N frequencies 110 (as shown in the example in FIG. 4) and at least one frequency sub-group contains K frequencies (a number of frequencies equal to the peak value K of the test signal). Essentially then, in step 232, system of the invention creates a frequency sub-group for each set of K frequencies that exist in the entire set of N frequencies to be used for the test signal. In this manner, since each frequency sub-group constitutes a substantially even cross-section of frequencies from the entire set of frequencies 110, a missing tone selected for omission anywhere within the set of frequencies 110 (either beforehand or afterwards, in embodiments of the invention which first parcel the set of frequencies into sub-groups and then allow a test developer to thereafter select missing tones) will only possibly slightly affect the peak value of only one sub-group (the sub-group distribution from which that missing tone is omitted) while the other frequency sub-groups will remain unaffected (i.e., will contains all tones from the even distribution).

Figure 10:
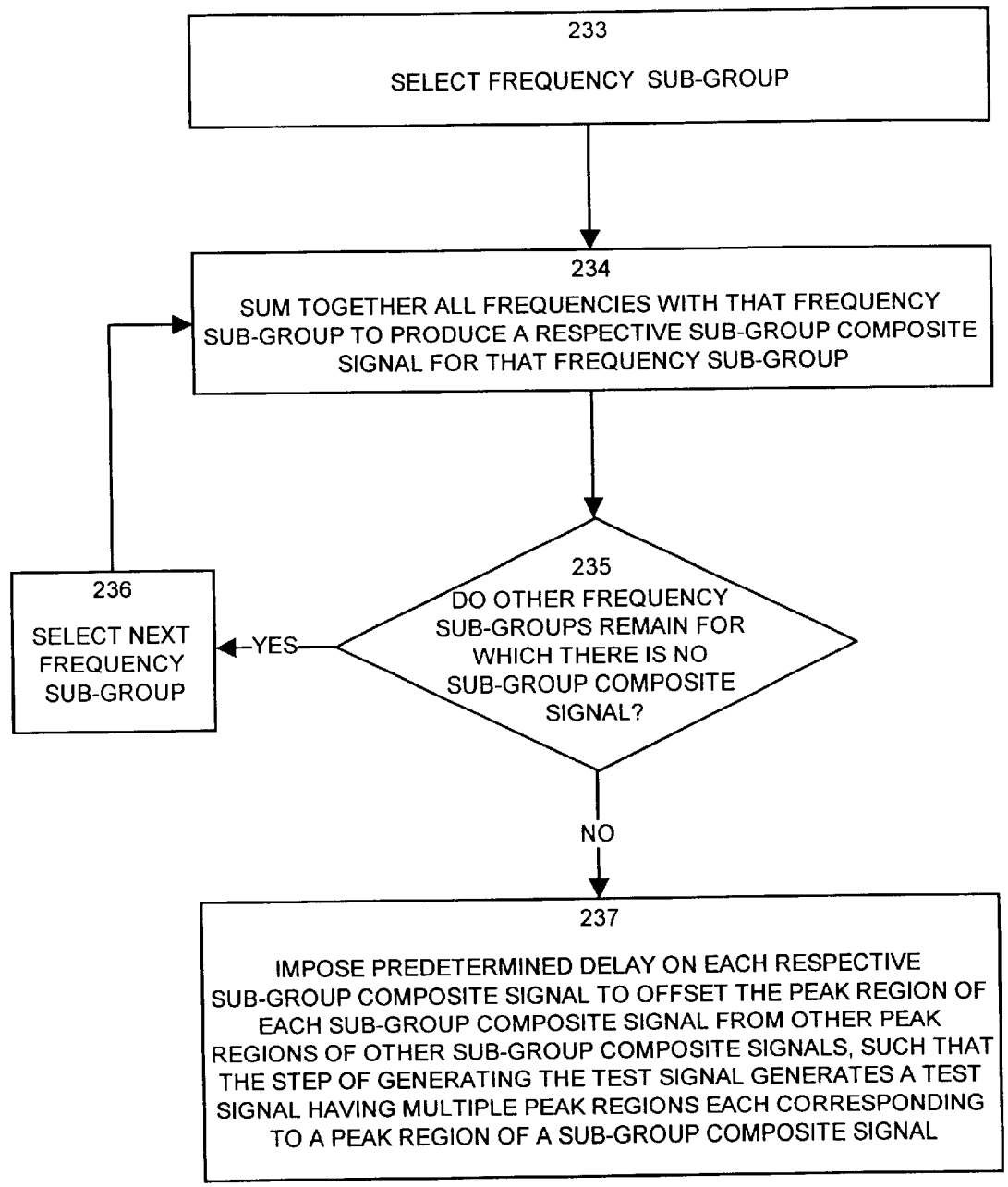
FIG. 10 is a flow chart of processing steps performed to generate sub-group composite signals and to impose a predetermined delay on each sub-group composite signal according to example embodiments of the invention.

FIG. 10 shows a flow chart of processing steps which show the details of processing performed and steps 212 and 213 of FIG. 7 according to example embodiments of the invention. It is to be understood that the processing steps shown in FIG. 10 (as well as those shown in FIGS. 8 and 9) are illustrative of example embodiments only and are not meant to be limiting to the invention. That is, other arrangements of such steps are possible will still achieving the overall objectives of the invention.

Generally, as previously explained with respect to steps 212 and 213 in FIG. 7, the system of the invention generates a respective sub-group composite signal 130 for each frequency sub-group and then time shifts those sub-group composite signals in relation to one another (to offset their peak values) such that when these delayed sub-group composite signals 132 are combined in step 214, their peak values 137, as expressed over the relatively short peak intervals do not interfere with one another in the resulting test signal 160.

As such, to generate respective sub-group composite signals 130 for each frequency sub-group, in step 233 in FIG. 10, the system of the invention selects a frequency sub-group from the set of available frequency sub-groups for which sub-group composite signals are to be generated.

Next, in step 234, the system of the invention sums together all frequencies within the selected frequency sub-group to produce a respective sub-group composite signal 130 for that frequency sub-group.

Next, processing proceeds to step 235 at which point the system of the invention determines if other frequency sub-groups remain for which a sub-group composite signal has not yet been computed via step 234. In step 235, if the system of the invention determines that other frequency sub-groups remain for which there is not yet a sub-group composite signal computed or processed, processing proceeds to step 236 at which point the system of the invention selects the next frequency sub-group for which to generate a sub-group composite signal.

Upon completion of step 236, the system of the invention returns to step 234 to process the next selected frequency sub-group in order to produce another respective sub-group composite signal 130. In step 235, when there are no frequency sub-groups remaining for which a sub-group composite signal has not yet be produced, processing proceeds to step 237.

In step 237, the system of the invention imposes a predetermined delay on each respective sub-group composite signal 130 in order to offset the peak region or peak interval 135 of each sub-group composite signal 130 from other peak regions of other sub-group composite signals, such that the step 214 in FIG. 7 of generating the test signal generates the test signal 160 having all multiple offset peak regions 138 each corresponding to a peak region of a sub-group composite signal which are collectively offset to one another so as to not interfere when summed together in step 214. In this manner, the system of the invention creates a test signal having multiple peak regions corresponding to respective sub-group composite signals that do not interfere with one another.

In one embodiment of the invention, the predetermined delay by which each sub-group composite signals is offset from the others can be determined, for example, by numbering each frequency sub-group, from 0 through a number M, and then multiplying this number M by a specific fixed delay increment to obtain a time by which to delay that sub-group composite signal. In this manner, each respective sub-group composite signal is distributed evenly within the test signal upon performing step 214 in FIG. 7 which generates the test signal.

By way of example, if there are four frequency sub-groups, each is numbered 0 through 3. The system of the invention then divides the period of the test signal by the number of frequency sub-groups squared, which is sixteen in this example, to obtain the delay increment. The delay increment thus represents the amount of time interval within the period of the test signal 160 between each peak interval 138. By multiplying this delay increment by a number assigned to each frequency sub-group, beginning with 0, the amount of time to delay or time shift for each sub-group composite signal can be computed. It should be clear that the first sub-group composite signal (e.g., 130-1) having an assigned number 0 would have no associated time shift or delay. The second sub-group composite signal (e.g. 130-2) having an assigned number 1 with have a delay equal to one times the delay increment. The third sub-group composite signal (e.g., 130-3) is time shifted or delayed by two times the delay increment, and the fourth sub-group composite signal (130-4) is shifted by three times the delay increment. If other sub-group composite signals are present, the process would continues for each sub-group composite signal (but the delay increment based on the number of sub-groups would be smaller) such that all sub-group composite signals are offset from one another by an equal amount of delay.

After the aforementioned processing of step 237 is complete, each sub-group composite signal is transformed into a delayed sub-group composite signal such as those illustrated as delayed sub-group composite signals 132-1 through 132-4 in FIG. 2. After the system of the invention processes the operations in step 237, processing returns to step 214 in FIG. 7 to generate the test signal by summing each of the respective delayed or time shifted sub-group composite signals 132 together to produce the resulting test signal (e.g., 160 in FIG. 2).

In this manner, the system of the invention is able to produce the test signal having multiple peak values. When the system of the invention is used for missing tone testing, missing tone frequencies removed from the set of frequencies used in the test signal will only affect peaks corresponding to the frequency sub-group for which those tones are removed, while other frequency sub-groups which do not contain frequencies witch are removed obtain peak values which are unchanged from one test signal to another. As such, a test developer (e.g., 112) can perform multiple tests of an xDSL device by providing multiple test signals generated according to the system of the invention as explained herein, and each test can specify different tones to be removed or omitted for missing tone testing. The omission of different tones during each test however does not adversely affect the average peak value of the resulting test signal generated by the invention for each test. This is because, preferably, missing tones are selected in limited quantities such that only certain frequency sub-groups will have a lesser number of frequencies (due to missing tones) than in a prior test and the peak values for those frequency sub-groups will only be slightly affected, while other peak values for other frequency sub-groups will remain unaffected by the omission of the selected missing tones.

Although this description uses ADSL as an example of devices that can be tested using a test signal as explained herein, other types of DSL devices that use DMT modulation can benefit from this technique, including G-Lite, SDSL, HDSL and VDSL, as well as any other types of testing or signal generation techniques that require removal or alteration of one or more frequencies within a set of frequencies while attempting to keep the remaining set of frequencies at a particular fixed level or peak value. Also as noted above, the system of the invention can be used to generate a signal for use by xDSL equipment that simply includes multiple peaks, whether or not missing tone testing is being performed.

Those skilled in the art will understand that there can be many variations made to the operations of the system explained above while still achieving the same objectives of the invention. Such variations are intended to be covered by the scope of this invention. As such, the foregoing description of embodiments of the invention are not intended to be limiting.

What is claimed is:

1. A method for generating a test signal, comprising the steps of:
   selecting a set of frequencies for the test signal;
   selecting frequency sub-groups from the set of frequencies;
   generating a respective sub-group composite signal for each frequency sub-group selected from the set of frequencies;
   time shifting each respective sub-group composite signal in relation to other sub-group composite signals; and
   generating the test signal by summing each respective time shifted sub-group composite signal to produce the test signal.

2. The method of claim 1 wherein the step of selecting a set of frequencies for the test signal includes the steps of:
   determining at least one start frequency and at least one stop frequency defining the set of N frequencies to be included in the test signal; and
   determining any intermediate frequencies to be included in the test signal between the at least one start frequency and the at least one stop frequency that occur at frequency intervals equal to a desired tone spacing of frequencies for the test signal.

3. The method of claim 2 wherein the step of determining at least one start frequency and at least one stop frequency defining the set of N frequencies to be included in the test signal includes the steps of:
   defining at least one missing tone frequency, the missing tone frequency defining a frequency to be omitted from the set of N frequencies in order to produce a test signal to be used for missing tone testing of a data communications device, such that the set of N frequencies for the test signal includes a plurality of ranges of frequencies each beginning with a start frequency and ending with a stop frequency.

4. The method of claim 2 wherein the step of determining any intermediate frequencies includes the step of selecting frequencies equal to carrier signals that match harmonics of a tone spacing frequency between the at least one start frequency and the at least one stop frequency.

5. The method of claim 1 wherein the step of selecting frequency sub-groups from the set of frequencies includes the steps of:
   determining a crest factor for the test signal;
   determining a desired peak value K for the test signal based on the crest factor for the test signal; and
   dividing the set of frequencies for the test signal into frequency sub-groups, wherein at least one frequency sub-group contains K frequencies selected from the set of frequencies.

6. The method of claim 5 wherein the step of dividing includes the steps of:
   dividing a number N of frequencies, representing all frequencies in the set of frequencies for the test signal, by the desired peak value K to determine a number of frequency sub-groups;
   selecting individual frequencies from the set of frequencies to be included in each frequency sub-group; and
   wherein the frequencies selected for each frequency sub-group are substantially selected evenly from across the N frequencies in the set of frequencies for the test signal, such that each frequency sub-group has substantially K frequencies evenly distributed across the N frequencies in the set of frequencies for the test signal.

7. The method of claim 5 wherein the step of determining a desired peak value K for the test signal includes the step of calculating the desired peak value K by multiplying the crest factor for the test signal by the average root mean square of a number N of frequencies in the set of frequencies for the test signal.

8. The method of claim 1 wherein
   the set of frequencies for the test signal is a discontinuous set of frequencies within a frequency range used for testing digital subscriber line devices; and
   wherein frequencies not included in the discontinuous set of frequencies are test tone frequencies that are intentionally omitted in order to perform missing tone tests on digital subscriber line devices.

9. The method of claim 1 wherein the step of generating a respective sub-group composite signal for each frequency sub-group includes the step of:
   for each respective frequency sub-group, summing together all frequencies within that frequency sub-group to produce a respective sub-group composite signal for that frequency sub-group.

10. The method of claim 1 wherein the step of time shifting each respective sub-group composite signal imposes a predetermined delay on each respective sub-group composite signal.

11. The method of claim 10 wherein the predetermined delay is calculated by dividing a period of the test signal by a number of frequency sub-groups squared to obtain a delay increment D and wherein, for frequency sub-groups numbered 0 through M, the predetermined delay imposed on each sub-group is equal to the delay increment D times the number 0 through M of that sub-group, such that each respective sub-group composite signal is distributed evenly within the test signal upon performing the step of generating the test signal.

12. The method of claim 1 wherein:
   each respective sub-group composite signal includes a peak region which occurs over a peak interval of a period of that sub-group composite signal; and
   wherein the step of time shifting each respective sub-group composite signal offsets the peak region of each sub-group composite signal from other peak regions of other sub-group composite signals, such that the step of generating the test signal generates a test signal having multiple peak regions, each corresponding to a peak region of a sub-group composite signal which are offset from one another.

13. A method for testing a device comprising the steps of:
   grouping a plurality of carrier signals into sub-groups of carrier signals;
   generating a test signal including multiple peaks, each peak corresponding to a respective sub-group of carrier signals; and
   providing the test signal to a device under test.

14. The method of claim 13 further including the step of:
   selecting a carrier signal to omit from a sub-group of carrier signals, such that a peak in the test signal corresponding to the sub-group of carrier signals from which the carrier signal is omitted reflects the omission of the carrier signal, while other peaks corresponding to other sub-groups of carrier signals are not significantly affected by the omission of the carrier signal.

15. The method of claim 14 further including the step of:
receiving an output signal from the device under test, the output signal based on the test signal; and
performing an analysis of the output signal to determine an effect that the device under test has on the test signal in relation to the carrier signal selected for omission from the sub-group of carrier signals.

16. A signal generation apparatus for generating a test signal, the signal generation apparatus comprising:
a frequency selector selecting a set of frequencies for the test signal and selecting frequency sub-groups from the set of frequencies;
at least one sub-group summer circuit coupled to the signal generation apparatus to receive the frequency sub-groups, the at least one sub-group summer circuit generating respective sub-group composite signals for the frequency sub-groups which it receives;
at least one delay shifter circuit coupled to the signal generation apparatus to receive at least one sub-group composite signal generated by the at least one sub-group summer circuit, the at least one delay shifter circuit time shifting at least one sub-group composite signal in relation to other sub-group composite signals such that the sub-group composite signals for the frequency sub-groups become delayed sub-group composite signals; and
a composite signal summer coupled the signal generation apparatus to receive and sum each delayed sub-group composite signal to produce the test signal.

17. The signal generation apparatus of claim 16 wherein the frequency selector includes:
means for determining at least one start frequency and at least one stop frequency defining the set of N frequencies to be included in the test signal; and
means for determining any intermediate frequencies to be included in the test signal between the at least one start frequency and the at least one stop frequency that occur at frequency intervals equal to a desired tone spacing of frequencies for the test signal.

18. The signal generation apparatus of claim 17 wherein the means for determining at least one start frequency and at least one stop frequency defining the set of N frequencies to be included in the test signal includes:
means for defining at least one missing tone frequency, the missing tone frequency defining a frequency to be omitted from the set of N frequencies in order to produce a test signal to be used for missing tone testing of a data communications device, such that the set of N frequencies for the test signal includes a plurality of ranges of frequencies each beginning with a start frequency and ending with a stop frequency.

19. The signal generation apparatus of claim 17 wherein the means for determining any intermediate frequencies includes means for selecting frequencies equal to carrier signals that match harmonics of a tone spacing frequency between the at least one start frequency and the at least one stop frequency.

20. The signal generation apparatus of claim 16 wherein the frequency selector includes:
means for determining a crest factor for the test signal;
means for determining a desired peak value K for the test signal based on the crest factor for the test signal; and
means for dividing the set of frequencies for the test signal into frequency sub-groups, wherein at least one frequency sub-group contains K frequencies selected from the set of frequencies.

21. The signal generation apparatus of claim 20 wherein the means for dividing includes:
means for dividing a number N of frequencies, representing all frequencies in the set of frequencies for the test signal, by the desired peak value K to determine a number of frequency sub-groups; and
means for selecting individual frequencies from the set of frequencies to be included in each frequency sub-group; and
wherein the frequencies selected for each frequency sub-group are substantially selected evenly from across the N frequencies in the set of frequencies for the test signal, such that each frequency sub-group has substantially K frequencies evenly distributed across the N frequencies in the set of frequencies for the test signal.

22. The signal generation apparatus of claim 20 wherein the means for determining a desired peak value K for the test signal calculates the desired peak value K by multiplying the crest factor for the test signal by the average root mean square of a number N of frequencies, representing all frequencies in the set of frequencies for the test signal.

23. The signal generation apparatus of claim 16 wherein:
the set of frequencies for the test signal is a discontinuous set of frequencies within a frequency range used for testing digital subscriber line devices; and
wherein frequencies not included in the discontinuous set of frequencies are test tone frequencies that a test developer intentionally omits in order to perform missing tone tests on digital subscriber line devices.

24. The signal generation apparatus of claim 16 wherein the at least one sub-group summer circuit generating a respective sub-group composite signal for each frequency sub-group sums together, for each respective frequency sub-group, all frequencies within that frequency sub-group to produce a respective sub-group composite signal for that frequency sub-group.

25. The signal generation apparatus of claim 16 wherein the at least one delay shifter circuit imposes a predetermined delay on each respective sub-group composite signal.

26. The signal generation apparatus of claim 25 wherein the at least one delay shifter circuit calculates the predetermined delay by dividing a period of the test signal by a number of frequency sub-groups squared to obtain a delay increment D; and
wherein, for frequency sub-groups numbered 0 through M, the predetermined delay imposed by the at least one delay shifter circuit on each sub-group is equal to the delay increment D times the number 0 through M of that sub-group, such that each respective sub-group composite signal is distributed evenly within the test signal upon operating the composite signal summer to generate the test signal.

27. The signal generation apparatus of claim 16 wherein:
each respective sub-group composite signal generated by the at least one sub-group summer circuit includes a peak region which occurs over a peak interval of a period of that sub-group composite signal; and
wherein the means for time shifting each respective sub-group composite signal offsets the peak region of each sub-group composite signal from other peak regions of other sub-group composite signals, such that the composite signal summer generates a test signal having multiple peak regions, each corresponding to a peak region of a sub-group composite signal which are offset from one another.

28. A system for testing a device, the system comprising:

a test signal generator grouping a plurality of carrier signals into sub-groups of carrier signals and generating a test signal including multiple peaks, each peak corresponding to a respective sub-group of carrier signals, the test signal generator including a test interface providing the test signal to a device under test.

29. The system of claim 28 further comprising:

a test developer interface allowing a test developer to select a carrier signal to omit from a sub-group of carrier signals, such that a peak interval in the test signal corresponding to the sub-group of carrier signals from which the carrier signal is omitted reflects the omission of the carrier signal, while other peak intervals corresponding to other sub-groups of carrier signals are not significantly affected by the omission of the carrier signal.

30. The system of claim 29 wherein:

the test interface receives an output signal from the device under test, the output signal based on the test signal; and a test signal analyzer coupled to receive the output signal performs an analysis of the output signal to determine an effect that the device under test has on the test signal in relation to the carrier signal selected for omission from the sub-group of carrier signals.

* * * * *